United States Patent
Westerwell et al.

(10) Patent No.: US 10,364,908 B2
(45) Date of Patent: Jul. 30, 2019

(54) METHOD FOR PRODUCING A HOUSING CENTRAL PART OF A HIGH-PRESSURE SLIDE GATE VALVE

(71) Applicant: STAHL-ARMATUREN PERSTA Gesellschaft mit beschraenkter Haftung, Warstein (DE)

(72) Inventors: Klaus Westerwell, Altena (DE); Elmar Floer, Bad Westerkotten (DE)

(73) Assignee: STAHL-ARMATUREN PERSTA Gesellschaft mit beschraenkter Haftung, Warstein (DE)

(*) Notice: Subject to any disclaimer, the term of this patent is extended or adjusted under 35 U.S.C. 154(b) by 0 days.

(21) Appl. No.: 15/514,024

(22) PCT Filed: May 29, 2015

(86) PCT No.: PCT/EP2015/062021
§ 371 (c)(1),
(2) Date: Mar. 24, 2017

(87) PCT Pub. No.: WO2016/045804
PCT Pub. Date: Mar. 31, 2016

(65) Prior Publication Data
US 2017/0335990 A1     Nov. 23, 2017

(30) Foreign Application Priority Data
Sep. 25, 2014   (DE) .................. 10 2014 013 998

(51) Int. Cl.
*F16K 27/04*    (2006.01)
*B23K 15/00*    (2006.01)
(Continued)

(52) U.S. Cl.
CPC ........ *F16K 27/105* (2013.01); *B23K 15/0053* (2013.01); *B23K 15/0093* (2013.01);
(Continued)

(58) Field of Classification Search
CPC ...... F16K 27/10; F16K 27/102; F16K 27/105; F16K 27/107; F16K 27/04; F16K 27/044;
(Continued)

(56) References Cited

U.S. PATENT DOCUMENTS

| | | | |
|---|---|---|---|
| 1,960,127 A | * | 5/1934 | Smith .................. F16K 27/105 251/329 |
| 3,913,887 A | | 10/1975 | Siepmann |

(Continued)

FOREIGN PATENT DOCUMENTS

| | | | | |
|---|---|---|---|---|
| CH | 202036 A | * | 12/1938 | .......... F16K 27/102 |
| CN | 1434233 A | | 8/2003 | |

(Continued)

OTHER PUBLICATIONS

International Search Report of PCT/EP2015/062021, dated Oct. 7, 2015.

(Continued)

*Primary Examiner* — Mary E Mcmanmon
*Assistant Examiner* — Hailey K. Do
(74) *Attorney, Agent, or Firm* — Collard & Roe, P.C.

(57) ABSTRACT

The invention relates to a method for producing a central housing part (1) of a high-pressure slide gate valve from high-temperature steel, in the case of which two die-forged central-housing-part half-shells (1a, 1b) with forged-on connectors (4a, 4b) are welded to one another, using electron-beam welding without any welding filler material, by a butt weld seam (2), which runs in a plane (3) which runs transversely to the connectors (4a, 4b) and subdivides the central housing part (1). In order to increase the creep resistance, and to reduce the weight, of such a central housing part, the production costs at the same time being advantageous, the invention proposes that the wall thicknesses of the central-housing-part half-shells (1a, 1b) should (Continued)

be designed overall on the basis of a weld strength factor (WSF=1), and that, once the weld seam (2) has been produced, the entire central housing part (1) should be subjected to a rigorous heat treatment involving heating to beyond the transformation temperature, quenching and tempering.

6 Claims, 4 Drawing Sheets

(51) Int. Cl.
    *B23K 15/10*     (2006.01)
    *F16K 27/10*     (2006.01)
    *F16K 27/02*     (2006.01)
    *F16K 27/00*     (2006.01)

(52) U.S. Cl.
    CPC .......... *B23K 15/10* (2013.01); *F16K 27/0281* (2013.01); *F16K 27/044* (2013.01); *F16K 27/003* (2013.01); *Y10T 29/49421* (2015.01); *Y10T 137/0514* (2015.04)

(58) Field of Classification Search
    CPC .... F16K 27/047; F16K 3/0227; F16K 3/0236; Y10T 29/49421; Y10T 29/49417; Y10T 29/49425; Y10T 29/49405; Y10T 29/49409; Y10T 29/49412; Y10T 29/49414; Y10T 29/49416; Y10T 137/0514; B23K 15/0046; B23K 15/0053; B23K 15/006; B23K 15/0093; B23K 15/04
    See application file for complete search history.

(56) References Cited

U.S. PATENT DOCUMENTS

| | | | | |
|---|---|---|---|---|
| 3,969,949 | A | * | 7/1976 | Ohnishi .................... B21L 9/02 474/230 |
| 4,243,204 | A | * | 1/1981 | Siepmann ............. F16K 27/105 251/329 |
| 4,349,948 | A | * | 9/1982 | Muller ...................... B21K 1/24 251/366 |
| 2004/0222399 | A1 | * | 11/2004 | Maichel ................ F16K 3/0272 251/326 |
| 2012/0295450 | A1 | * | 11/2012 | Koplow ................. H01R 13/33 439/18 |
| 2015/0344987 | A1 | * | 12/2015 | Tuttle ....................... C21D 1/42 219/635 |

FOREIGN PATENT DOCUMENTS

| | | | |
|---|---|---|---|
| CN | 102653034 A | 9/2012 | |
| CN | 103032592 A | 4/2013 | |
| DE | 28 07 740 A1 | 9/1979 | |
| DE | 2847580 A1 * | 5/1980 | ............... B21K 1/24 |
| DE | 100 10 367 B4 | 10/2001 | |
| DE | 102013009209 A1 | 3/2014 | |
| EP | 132 671 A2 | 9/2001 | |

OTHER PUBLICATIONS

K. Abburi Venkata et al., Study on the Effect of Post Weld Heat Treatment Parameters on the Relaxation of Welding Residual Stresses in Electron Beam Welded P91 Steel Plates, Procedia Engineering, 2014, pp. 223-233, vol. 86, Elsevier Ltd.

Amrita Kundu et al., Characterisation of Residual Stress in Electron Beam Welded P91 Plates by Neutron Diffraction, International Journal of Metallurgical Engineering, 2013, pp. 79-84, vol. 2 No. 1.

* cited by examiner

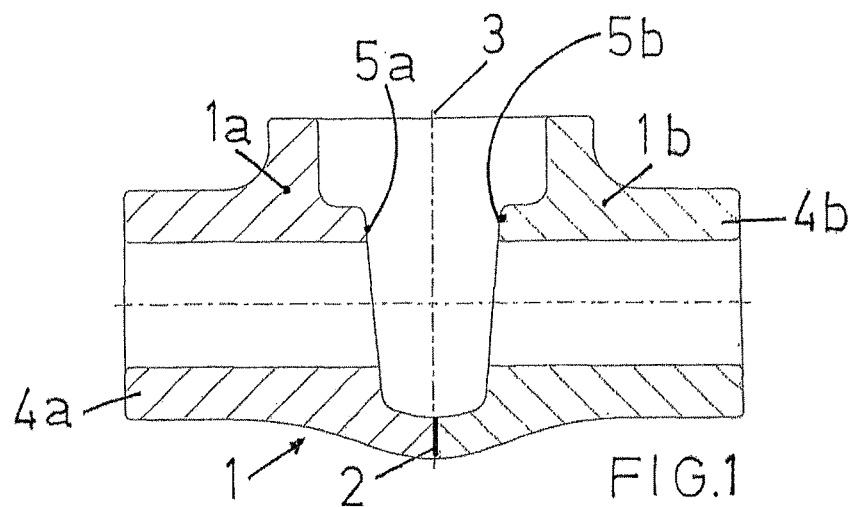
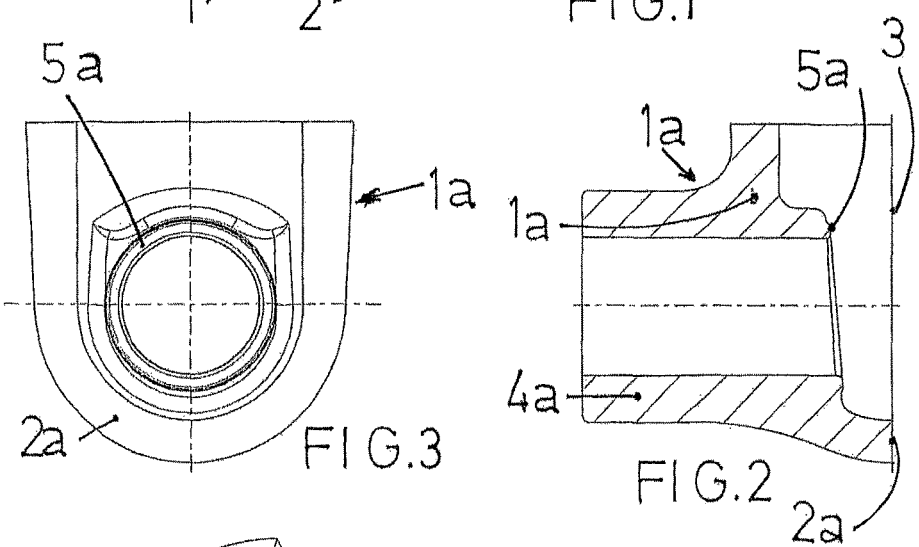
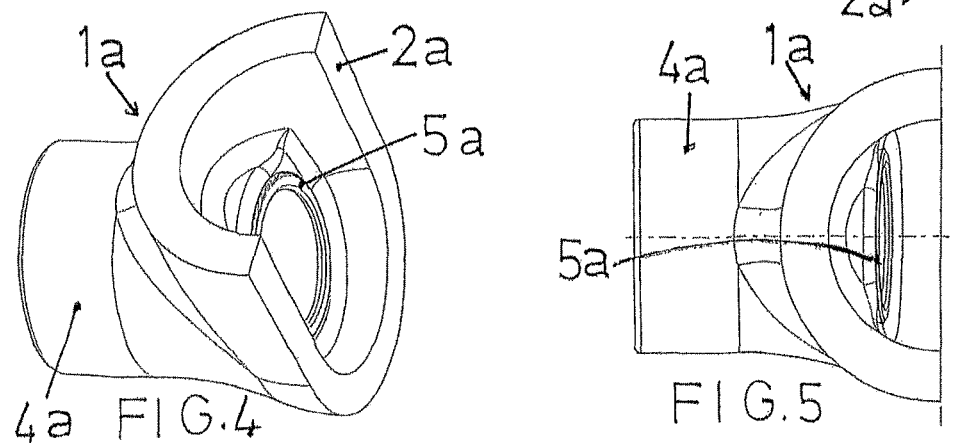

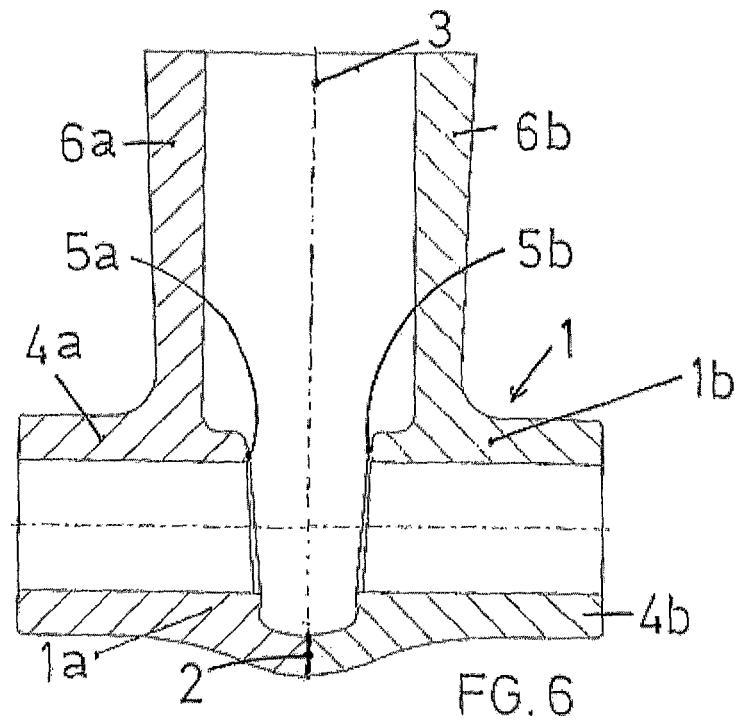
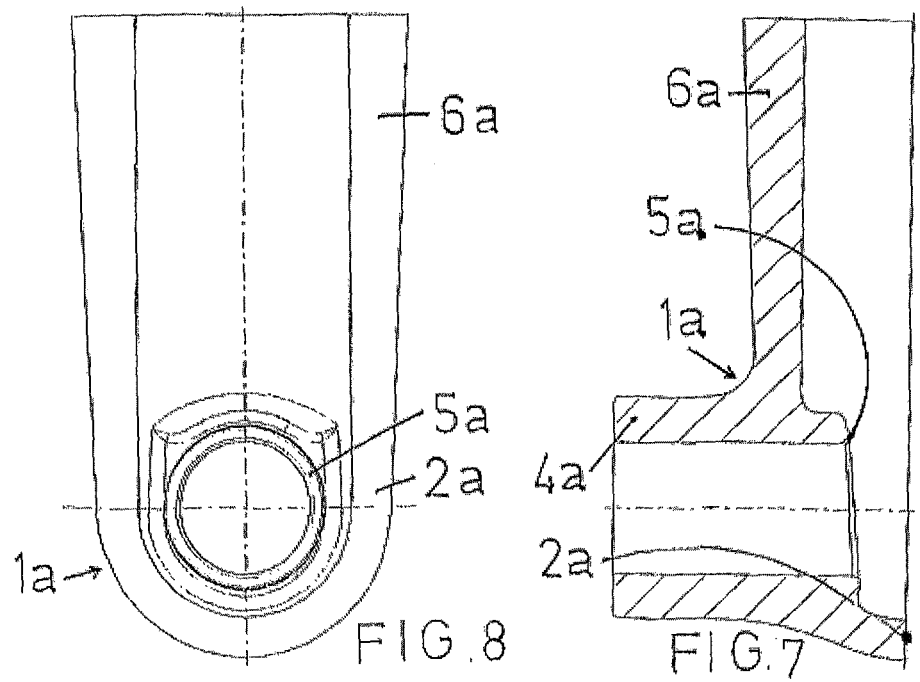

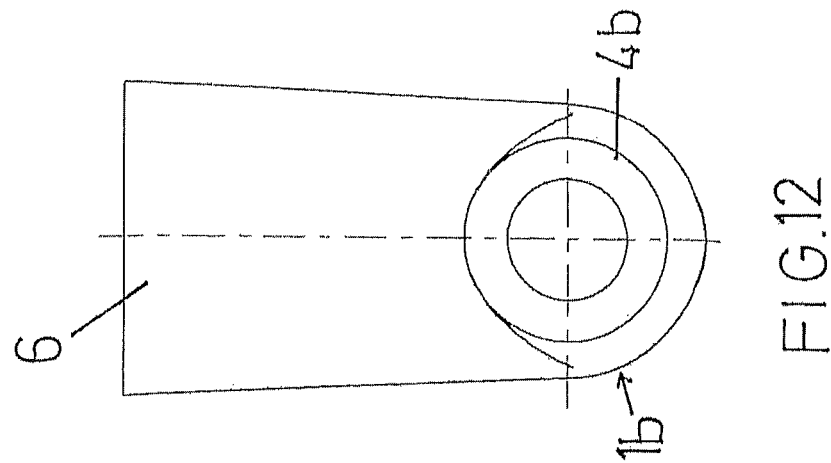
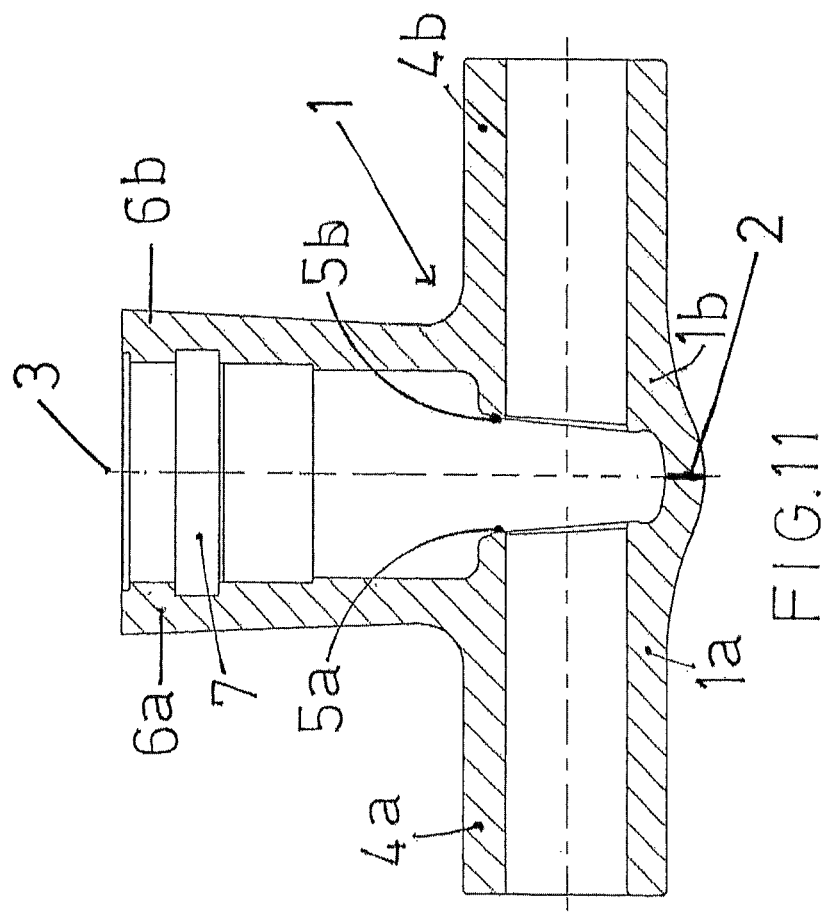

METHOD FOR PRODUCING A HOUSING CENTRAL PART OF A HIGH-PRESSURE SLIDE GATE VALVE

CROSS REFERENCE TO RELATED APPLICATIONS

This application is the National Stage of PCT/EP2015/062021 filed on May 29, 2015, which claims priority under 35 U.S.C. § 119 of German Application No. 10 2014 013 998.0 filed on Sep. 25, 2014, the disclosure of which is incorporated by reference. The international application under PCT article 21(2) was not published in English.

The invention relates to a method for producing a central housing part of a high-pressure slide gate valve from high-temperature steel, in the case of which two die-forged central-housing-part half-shells with forged-on connectors are connected to one another, using electron-beam welding without any welding filler material, by a butt weld seam, which runs in a plane which runs transversely to the connectors and subdivides the central housing part.

Such a method is known, for example, from DE 100 10 367 B4. In view of more stringent requirements, however, it has run into problems, to be precise for the following reason:

In the recent past, so-called renewable energies from wind and solar power stations have been used to an increasing extent for supplying electric energy. Since these energy sources are not available on a continuous basis, it is necessary for the unavoidable gaps in supply to be filled by thermal power stations, of which the output can quickly rise and fall, depending on requirements, possibly a number of times a day. As a result, all the heat-conducting fittings of said thermal power stations not only have to withstand the high temperatures of more than 600° C., and pressures of more than 200 bar, which are necessary for good efficiency, but in addition are exposed to fluctuating temperatures with steep temperature gradients. For this reason, the fittings of such thermal power stations are made exclusively from high-temperature steels, in particular 9 to 12% Cr martensitic steels, e.g. X 10 CrMoVNb9-1 (material number 1.4903, abbreviated chemical name P91) or X10CrWMoVNb9-2 material number 1.4901, abbreviated chemical name P92). Other high-temperature steels can also be used if appropriate.

The aforementioned new load spectra are problematic, in particular, for all the weld seams on the components of high-temperature steel. This is because, on account of the complexity of the microstructure of said steels, there is a considerable drop in the creep-rupture strength in the heat-affected zones (HAZ) of the weld seams, and said drop cannot be eliminated even by local heat treatment of the weld seams. For this reason, the relevant test and monitoring specifications for pressure-loaded, welded housings made of such high-temperature steels require account to be taken of a sufficient weld strength factor (WSF) and also require special authorization for the welding filler material which may be used to fill the weld seam.

The weld strength factor (WSF) quickly decreases to a considerable extent as the test temperature increases. Thus, for example for a 12% CrMoV steel, it is necessary to have a weld strength factor of WSF=0.8 at a test temperature of 500° C. and a weld strength factor of WSF=0.5 at a test temperature of 600° C. This means that, at test temperatures of above 600° C., the wall thickness—at least in the region of the weld seams—has to be doubled. This, of course, results in a pronounced increase in weight.

The thickening of the walls which is necessary on account of the weld strength factor WSF, however, impairs the creep-rupture strength of the housing if the latter is frequently subjected to large temperature fluctuations with steep temperature gradients. This is because, in the case of thick walls, the differences in temperature which form from the inside toward the outside, or from the outside toward the inside, result in pronounced, multiaxial stressing in the interior of the material, and said stressing adversely affects the creep-rupture strength. The wall thickenings which are necessary on account of the unfavorable weld strength factor therefore render the housing body sensitive to rapidly changing temperature fluctuations.

It is, indeed, the case that electron-beam welding manages without welding filler materials, and this therefore renders superfluous the difficult task of selecting a suitable welding filler material. However, even in the case of electron-beam welding, there are narrowly confined heat-affected zones (HAZ) which extend along the weld seam and in which changes to microstructure which impair the creep-rupture strength occur. The most recent investigations of such weld seams produced by electron-beam welding, which have been carried out using neutron diffraction, have shown that the stressing which impairs the creep-rupture strength remains in the vicinity of such weld seams even when a subsequent attempt is made to render said weld seams free of stressing using the local heat treatments which are customary in the prior art (cf. "Characterization of Residual Stress in Electron Beam welded P91 Plates by Neutron Diffraction", published in the International Journal of Metalurgical Engineering 2013, 2(1): 79-84).

For this reason, the relevant test and monitoring specifications for pressure-loaded, welded housings stipulate the above-discussed weld strength factors even when the weld seams are produced by electron-beam welding without any welding filler materials. As a result, the new load spectra discussed above mean that the limit of what is technically possible has been reached.

This dilemma makes it virtually impossible to use the means available from the prior art to produce a central housing part which is intended for a high-pressure slide gate valve of the type specified and withstands the new load spectra discussed above for a sufficiently long period of time. Various tests to produce the central housing part in one piece, to be precise by milling the same from a large block or by forging the hollow body in one piece, have proven to be prohibitively expensive and also technically impractical because there are difficulties in providing a sufficiently thin-walled design with the seat surfaces (sealing surfaces) for the slide plates which are necessary in the interior of the central housing part. This is because the weld seams or grooves which are necessary in the interior of the central housing part likewise impair the creep-rupture strength to a considerable extent.

It is therefore an object of the invention to develop the method of the type mentioned in the introduction to the extent where straightforward means can be used to produce a significantly more lightweight central housing part which, even in the case of frequent changes in temperature with steep temperature gradients has a sufficient creep-rupture strength.

In order to achieve this object, proceeding from the method of the type mentioned in the introduction, the invention proposes that the wall thickness of the housing half-shells should be designed overall on the basis of a weld strength factor WSF=1, and that, once the weld seam has been produced, the entire central housing part should be subjected to a rigorous heat treatment involving heating to beyond the transformation temperature, quenching and tempering.

The invention makes use, first of all, of the fact that, even in the case of a large weld-seam depth, electron-beam welding manages without any welding filler material, because the base materials at each of the flanks of the butt weld seam are fused directly to one another. Since the heat of fusion is focused within very narrow confines for this welding method, this also means that only very narrow heat-affected zones (HAZ) result alongside the weld seams. The rigorous heat treatment which is provided at the end according to the invention and involves heating to beyond the transformation temperature, quenching and tempering, which means that the definitively welded central housing part is quenched and tempered anew in its entirety, makes it possible to produce in the base material, above and beyond the weld seam, a new, undisturbed quenched-and-tempered microstructure, and therefore the weld seam disappears completely and is no longer detectable as such by the customary microstructure investigations. For this reason, it is possible and admissible for the first time for the wall thicknesses of said central housing part to be designed overall on the basis of a weld strength factor WSF=1. This means that this welded central housing part no longer requires any weld-seam-induced wall thickenings, can therefore be designed to be considerably more lightweight than the conventional electron-beam-welded central housing parts and in addition, on account of its walls being thinner overall, better withstands the new load spectra explained above. In comparison with the known methods for producing seamless central housing parts by forging a hollow body or milling the same from a block, the method according to the invention is considerably more cost-effective as far as production outlay, is concerned and, in addition to a considerable reduction in weight, allows a configuration of the inner sides of the housing which is better adapted to requirements and has seat surfaces and guide devices for the slide plates forged therein.

Accordingly, the method according to the invention provides that, during die forging, the central-housing-part half-shells are forged in one piece, including the seat surfaces and the connectors. This has the particular advantage that there is no need for any recesses for seat rings, which are often a starting point for crack formation, to be made subsequently.

It is also provided that, during die forging, housing-neck half-shells are forged in one piece onto the central-housing-part half-shells, and that, during electron-beam welding, the central-housing-part half-shells, provided with forged-on housing-neck half-shells, are welded to form a housing with a neck, wherein the butt weld seams run in the same plane between the two central-housing-part half-shells and the two housing-neck half-shells. This means that there is no need for a housing neck to be welded on subsequently, which operation has been unavoidable hitherto in the case of central housing parts produced in one piece. Since the butt weld seams of central-housing-part half-shells and housing-neck half-shells are located in the same plane, the weld seams can be executed to a certain extent in one operation, and with a single clamping process, in the welding apparatus.

In the case of the method according to the invention, it is also possible at the same time for the grooves for accommodating a supporting ring for a self-sealing housing closure cover to be made in the inner sides of the housing-neck halves.

The same applies to the guide elements which are necessary on the inside of the central-housing-part half-shells and/or of the housing-neck half-shells for the purpose of guiding the slide plates of the high-pressure slide gate valve.

Exemplary embodiments of the invention will be explained in more detail hereinbelow with reference to the drawing, in which:

FIG. 1 shows a longitudinal section of a central housing part according to the invention;

FIG. 2 shows a longitudinal section through the left-hand central-housing-part half-shell from FIG. 1;

FIG. 3 shows a view of FIG. 2 as seen in the throughflow direction;

FIG. 4 shows a perspective view of the central-housing-part half-shell according to FIGS. 2 and 3;

FIG. 5 shows a plan view, as seen from above, of FIG. 2;

FIG. 6 shows a longitudinal section of a housing with a housing neck produced by the method of the invention;

FIG. 7 shows a longitudinal section through the left-hand housing half-shell with neck according to FIG. 6;

FIG. 8 shows a view of FIG. 7 as seen in the throughflow direction;

FIG. 11 shows a longitudinal section of a housing with a neck in a modified embodiment produced by the method according to the invention; and FIG. 12 shows a view of FIG. 11 as seen in the throughflow direction.

Figure 9:
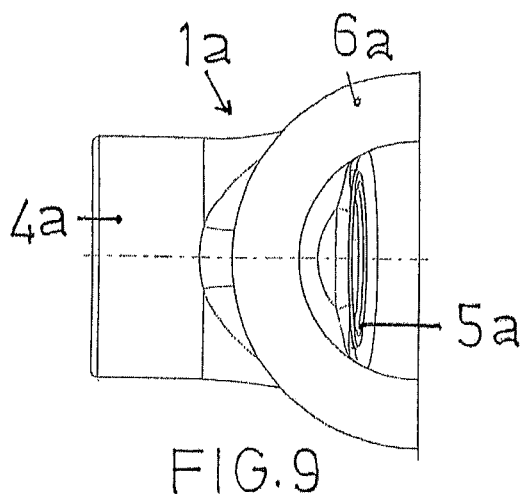
FIG. 9 shows a plan view, as seen from above, of FIG. 7.

The drawing uses reference sign 1 to denote the high-temperature-steel central housing part of a high-pressure slide gate valve in its entirety. Said central housing part comprises two central-housing-part half-shells 1*a* and 1*b*, which are welded to one another along a butt weld seam 2, with weld-seam flanks 2*a* and 2*b*, by electron-beam welding without any welding filler material. The butt weld seam 2 runs in a plane 3 which runs transversely to the throughflow direction of the high-pressure slide gate valve and subdivides the central housing part 1 approximately in the center.

The central-housing-part half-shells 1*a* and 1*b* are forged in the die by the method according to the invention. They are particularly well-suited for such working in the die because they are accessible over a large surface area from opposite sides.

The walls of the central-housing-part half-shells 1*a* and 1*b* are designed to be as thin as possible, with account being taken of the static, thermal and thermodynamic loading, and, in particular in the region of the weld-seam flanks 2*a* and 2*b* have no material thickenings. The wall thicknesses are thus designed overall on the basis of a weld strength factor WSF=1.

As can also be seen from the drawing, the two central-housing-part half-shells 1*a* and 1*b* are provided with forged-on, tubular connectors 4*a* and 4*b* and with seat surfaces 5 which are forged in one piece into their inner sides and enclose the connectors 4*a* and 4*b*.

Figure 10:
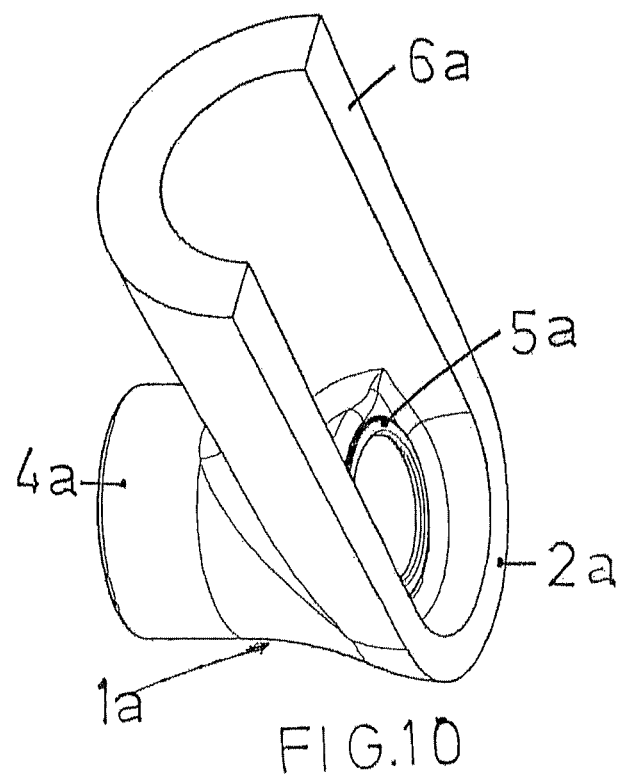
FIG. 10 shows a perspective view of the housing half-shell according to FIG. 7.

As can also be gathered from FIGS. 6 to 10 and FIGS. 11 and 12, it is also possible, in die forging, for the central-housing-part half-shells 1*a* and 1*b* to be provided with forged-on housing-neck half-shells 6*a* and 6*b* which, in a manner similar to the central-housing-part half-shells 1*a* and 1*b*, are connected, by electron-beam welding without any welding filter material, to form a housing neck 6 which extends the central housing part 1 upward. The butt weld seams connecting the housing-neck half-shells 6*a* and 6*b* run in the same plane here, as does the weld seam 2 which connects the central-housing-part half-shells 1a and 1b.

As can also be seen from FIG. 11, grooves 7, which serve for supporting a cover closure (not illustrated) which seals the housing neck 6 in the upward direction, can be forged into the inner sides of said housing-neck half-shells 6a and 6b. It is likewise possible for the central-housing-part half-shells 1a and 1b and/or the housing-neck half-shells 6a and 6b to be provided with forged-in guide elements (not illustrated specifically) for the slide plates of the high-pressure slide gate valve.

In order to prepare for the electron-beam welding operation, first of all the surfaces which are to be welded to one another are ground to a smooth state. During the following welding operation, the abutting flanks are fused to one another directly without any welding filler material. The heat which is necessary for this purpose is introduced into the gap between the smooth-ground flanks by means of an electron beam.

The definitively welded housing is then subjected as a whole to a rigorous heat treatment involving heating beyond the transformation temperature, quenching and tempering. As the welded housing is quenched and tempered anew in its entirety, this process being executed in accordance with the customary quenching and tempering rules of the relevant high-temperature steel, it is also the case that, above and beyond the weld seams, an undisturbed quenched-and-tempered microstructure is achieved. As a result, the housing which is produced in this way has the properties of a seamless housing produced from the same material.

The invention claimed is:

1. A method for producing a central housing part of a high-pressure slide gate valve from high-temperature steel, with first and second die-forged central-housing-part half-shells with forged-on connectors welded to one another, using electron-beam welding without any welding filler material, by a butt weld seam, which runs in a plane which runs transversely to the connectors and subdivides the central housing part, the method comprising:
    designing wall thicknesses of the first and second central-housing-part half-shells overall on a basis of a weld strength factor equal to one, and
    once the butt weld seam has been produced, subjecting the entire central housing part to a rigorous heat treatment involving heating to beyond the transformation temperature, quenching and tempering,
    wherein walls of the first and second central-housing-part half shells are designed to be as thin as possible, with account being taken of the static, thermal and dynamic loading.

2. The method as claimed in claim 1, further comprising forging during die forging the first and second central-housing-part half-shells, including the seat surfaces and the connectors of the first and second central-housing part half-shells, to form one piece.

3. The method as claimed in claim 1, further comprising
    forging during die forging first and second housing-neck half-shells onto the first and second central-housing-part half-shells to form one piece, and
    during electron-beam welding, welding the first and second central-housing-part half-shells with the first and second housing-neck half-shells forged on the first and second central-housing-part half-shells in one piece, to form a housing with a neck,
    wherein the butt weld seam runs in the same plane between the first and second central-housing-part half-shells and the first and second housing-neck half-shells.

4. The method as claimed in claim 3, wherein, during die forging, grooves for accommodating a supporting ring of a self-sealing housing-neck cover closure are made in the sides of the first and second housing-neck half-shells.

5. The method as claimed in claim 3, wherein, during die forging, guide elements for slide plates of the high-pressure slide gate valve are forged into inner sides of the first and second central-housing-part half-shells and/or of the first and second housing-neck half-shells.

6. A method for producing a central housing part of a high-pressure slide gate valve from high-temperature steel, the method comprising:
    (a) providing a first central-housing-part half-shell and a second central-housing-part half-shell, the first and second central-housing-part half shells having a respective wall thickness configured to obtain a weld strength factor equal to one,
    (b) die-forging a first connector to the first central-housing-part half-shell and a second connector to the second central-housing-part half shell to form die-forged first and second central-housing-part half shells,
    (c) welding the first and second die-forged central-housing-part half-shells to one another so that the central housing part is formed with a weld strength factor equal to one, the welding using electron-beam welding without any welding filler material and forming a butt weld seam, the butt weld seam running in a plane, the plane running transversely to the first and second connectors and subdividing the central housing part, and
    (d) after the welding, subjecting all of the central housing part to a heat treatment, the heat treatment comprising heating to beyond a transformation temperature, quenching, and tempering.

* * * * *